Oct. 7, 1958

E. M. MOORE 2,855,116

VEHICLE MOUNTED EARTH MOVING APPARATUS

Filed Feb. 2, 1956

Emanuel M. Moore
INVENTOR.

BY *Clarence A. O'Brien*
*and Harvey B. Jackson*
Attorneys

Oct. 7, 1958     E. M. MOORE     2,855,116
VEHICLE MOUNTED EARTH MOVING APPARATUS
Filed Feb. 2, 1956     7 Sheets-Sheet 2

Emanuel M. Moore
INVENTOR.

Fig. 3A

Emanuel M. Moore
INVENTOR.

Oct. 7, 1958  E. M. MOORE  2,855,116
VEHICLE MOUNTED EARTH MOVING APPARATUS
Filed Feb. 2, 1956  7 Sheets-Sheet 4

Fig. 4

Emanuel M. Moore
INVENTOR.

BY

Oct. 7, 1958 E. M. MOORE 2,855,116
VEHICLE MOUNTED EARTH MOVING APPARATUS
Filed Feb. 2, 1956 7 Sheets-Sheet 5

Emanuel M. Moore
INVENTOR.
BY

Oct. 7, 1958   E. M. MOORE   2,855,116
VEHICLE MOUNTED EARTH MOVING APPARATUS
Filed Feb. 2, 1956   7 Sheets-Sheet 6

Emanuel M. Moore
INVENTOR.

United States Patent Office 2,855,116
Patented Oct. 7, 1958

2,855,116

VEHICLE MOUNTED EARTH MOVING APPARATUS

Emanuel M. Moore, Pine Bluff, Ark.

Application February 2, 1956, Serial No. 562,996

16 Claims. (Cl. 214—91)

This invention generally relates to an earth moving apparatus and more specifically provides a mobile device having a longitudinally extending conveyor for picking up earth and moving it longitudinally of the unit together with a transverse conveyor receiving the earth from the longitudinal conveyor for depositing the dirt laterally of the apparatus.

An object of the present invention is to provide an earth moving apparatus which is self-powered and mobile and provided with suitable control mechanism for steering and operating the apparatus for the purposes intended.

Another object of the present invention is to provide an earth moving apparatus having a longitudinally elongated frame with a conveying means disposed longitudinally thereon forming a primary conveying means together with a secondary conveying means disposed transversely at the rear end of the primary conveying means for discharging earth laterally to the side of the apparatus.

A further object of the present invention is to provide an earth moving apparatus in accordance with the preceding objects including means for universally positioning the longitudinal conveyor on the mobile frame for permitting the conveyor to be employed for picking up or gathering earth from various positions.

Yet another object of the present invention is to provide an earth moving apparatus in accordance with the preceding object which includes means for moving the transverse conveyor transversely of the apparatus for discharging the earth to either side of the apparatus.

A still further object of the present invention is to provide an earth moving apparatus in accordance with the preceding objects in which the relationship between the transverse conveying means and the longitudinal conveying means is maintained in the various positions of adjustment thereof.

Yet another important feature of the present invention is to provide an earth moving apparatus including a horizontal scoop type bucket on the front of the longitudinal conveying means for picking up earth from a horizontal surface or a vertical type bucket for digging material from a vertical surface and depositing the same on the primary conveying means.

Still another very important object of the present invention is to provide an apparatus for moving earth wherein a grader blade is provided at the rear end thereof and a conveying means is provided adjacent the front end thereof whereby the grader blade is disposed laterally of the machine for pulling material to be moved into a desired position at the same time the conveying means is picking up earth which was moved by the grader blade on the previous pass of the earth moving apparatus.

Other important objects of the present invention will reside in its relative simplicity of construction, adaptation for its many purposes, provision of two independent power units for operating the primary and secondary conveying means, ruggedness of construction and its relatively inexpensive maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now specifically to the drawings, the numeral 10 generally designates the earth moving apparatus of the present invention which includes a mobile frame generally designated by the numeral 12 having a primary conveying means generally designated by the numeral 14 disposed thereon together with a secondary conveying means generally designated by the numeral 16 disposed at the rear end of the primary conveying means 14 for discharging earth laterally of the earth moving machine or apparatus 10. At the forward end of the primary conveying means 14 an earth engaging member generally designated by the numeral 18 is provided for guiding the earth onto the primary conveying means 14. For purposes of illustration, various lubrication fittings have been omitted and the specific details of the drive mechanism whereby the entire vehicle or apparatus 10 is self-propelled has been omitted and it will be understood that any suitable driving arrangement may be employed.

The mobile frame generally includes a pair of longitudinally elongated and substantially parallel side frames 20 which are interconnected by suitable transverse braces or the like. Adjacent the rear of the frame rails 20 is a pair of driving wheels 22 on each side of the machine 10 wherein the driving wheels 22 are supported by the usual axles and supporting springs 24 wherein the details of the driving connection to the drive wheels 22 is not shown and it will be understood that any suitable differential arrangement and power transmisison may be employed. Adjacent the front of the frame rails 20 is provided a pair of steerable and tiltable wheels 26 whereby means is provided for pivoting the wheels 26 about a substantially vertical and also a substantially horizontal axis in a manner described hereinafter. Mounted upon the mobile frame 12 adjacent the rear end thereof is a prime mover 28 preferably in the form of a suitable internal combustion engine and immediately forward of the prime mover 28 is provided an operator seat 30 together with suitable control mechanism generally designated by the numeral 32 whereby the operator may observe the progress of the machine 10 and by proper manipulation of the control mechanism 32 cause the machine 10 to operate in the intended manner.

Disposed forwardly of the operator's seat 30 is provided a pair of brackets 34 pivotally supporting a sub-frame generally designated by the numeral 36 which includes a pair of side frame rails 38 having a centrally disposed upwardly curved portion 40 forming an opening or concave area for receiving the guide wheels 26. The forward ends of the side rails 38 of the sub-frame 36 are pivotally attached by pivot members 42 to a pair of depending brackets 44 on the primary conveying means 14.

Figure 4:
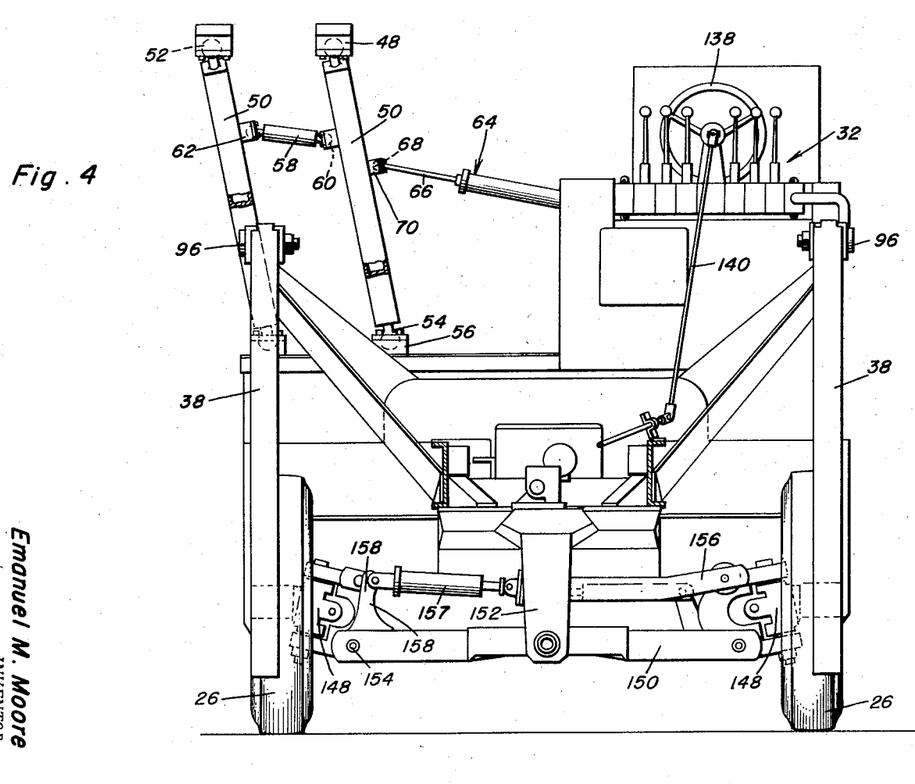
Figure 4 is a front view of the apparatus with the conveying mechanism removed illustrating certain details of the storing mechanism as well as the means for adjusting the rear end of the conveying mechanism.

The primary conveying means 14 includes an elongated supporting framework 46 with one end thereof having the depending brackets 44 and the other end thereof being supported by a pair of brackets 48 engaging the undersurface of the frame 46 and the brackets 48 are supported by a pair of rigid elongated struts 50 which are interconnected with the brackets 48 by a ball joint 52. The lower ends of the supporting struts or braces 50 are provided with ball members 54 which are received in sockets 56 mounted on the mobile frame 12 thereby supporting the rear end of the primary conveying means 14. Retaining the supporting struts or braces 50 in parallel relation is a connector bar 58 disposed adjacent the top end of the braces 50 but in spaced relation from the upper ball members 52. Each end of the connector bar 58 is provided with a ball member 60 disposed in ball socket members 62 disposed rigidly on the adjacent surfaces of the struts or braces 50. The struts or braces 50 are of hollow construction as illustrated in Figure 4 and the connecting member 58 retains the braces 50 in spaced parallel relation.

For positioning the braces or struts 50 in a desired vertical plane, a hydraulically actuated piston and cylinder arrangement 64 is provided wherein a piston rod 66 has a ball member 68 disposed in a ball socket 70 on the outer surface of one of the braces 50. The other end of the piston and cylinder arrangement 64 is connected to the mobile frame 12 whereby the brace members 50 may be adjusted in a vertical plane by suitable expansion and contraction of the fluid pressure actuated piston cylinder arrangement 64.

Figure 3:
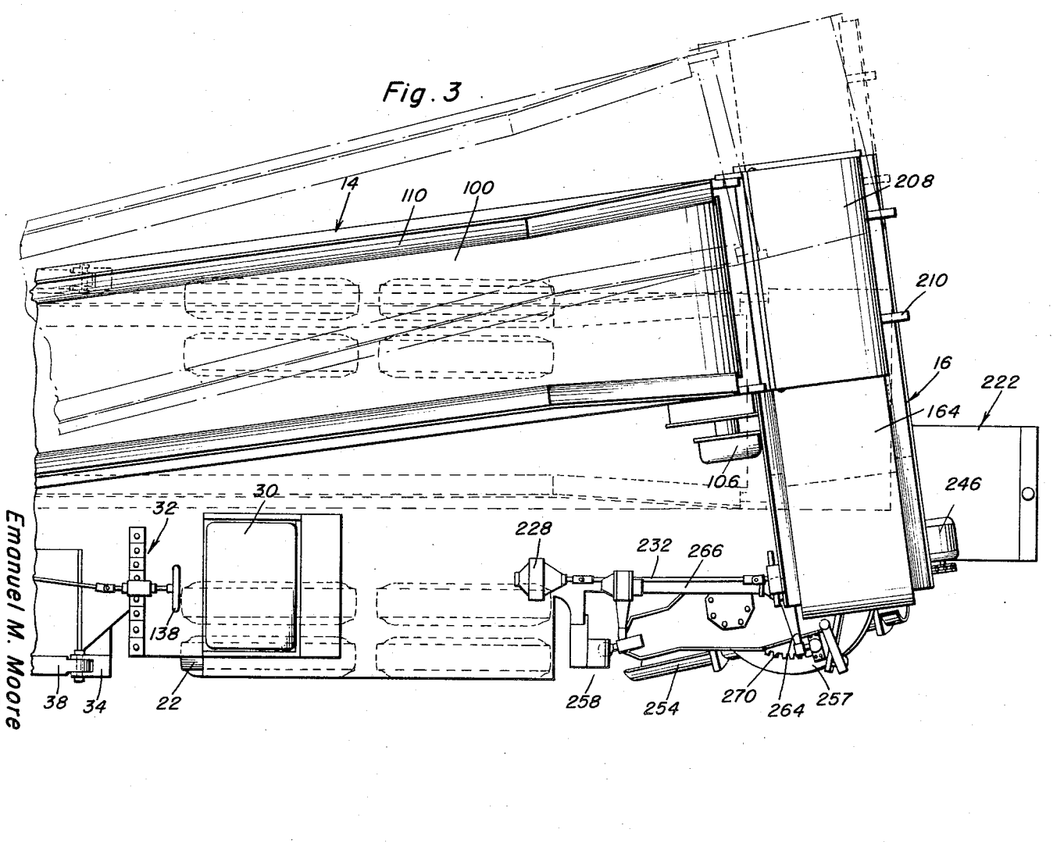
Figure 3 is an enlarged top plan view of the rear portion of the apparatus.
Figure 3A:
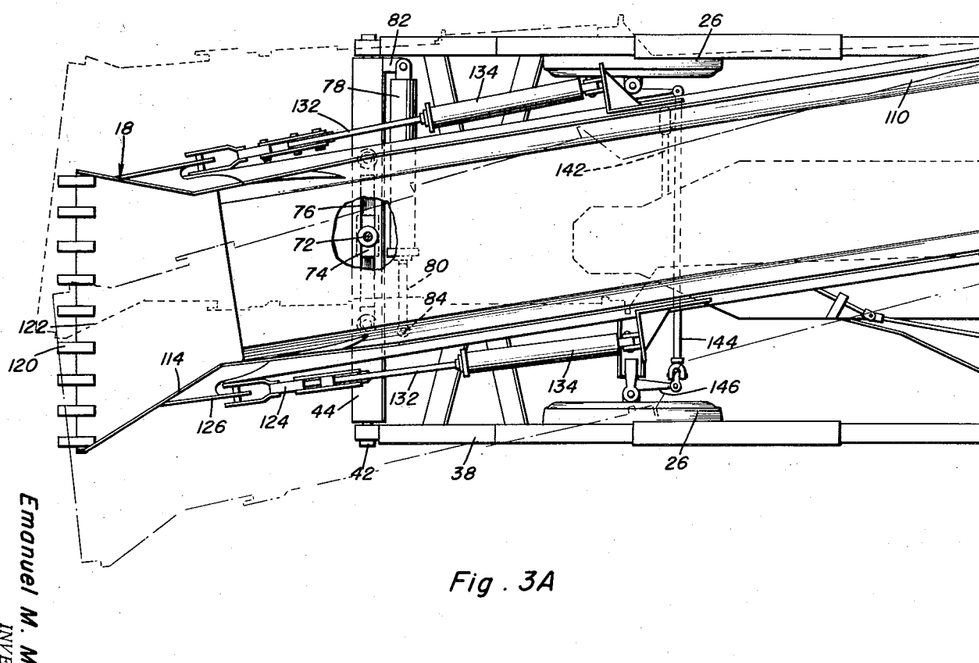
Figure 3A is a top plan view on an enlarged scale with portions thereof broken away illustrating the front end of the apparatus.

As will be specifically illustrated in Figure 3A, it will be noted that the frame 46 of the primary conveying means 14 is provided with a depending pin 72 terminating in a carrier block 74 slidably received within the hollow depending member 44 which has the pivot rod 42 mounted therein. The depending hollow bracket member 44 is provided with a longitudinal slot 76 therein for permitting movement of the carrier block 74 transversely of the mobile frame 12. This depending supporting rod 72 also permits the rear end of the primary conveyor 14 to be swung laterally in relation to the mobile frame 12. For moving the front end of the conveying means 14 laterally of the frame 12, a fluid pressure actuated cylinder 78 is provided and has a reciprocal piston rod 80 extending therefrom. The cylinder 78 is pivotally attached to bracket means 82 on the depending hollow member 44 while the piston rod 80 is pivotally attached to a pin 84 on the framework 46 of the primary conveyor 14 whereby expansion and contraction of the piston and cylinder arrangement 78 and 80 will cause transverse movement of the forward end of the primary conveying means 14 in relation to the sub-frame 36 and the mobile frame 12.

Figure 1:
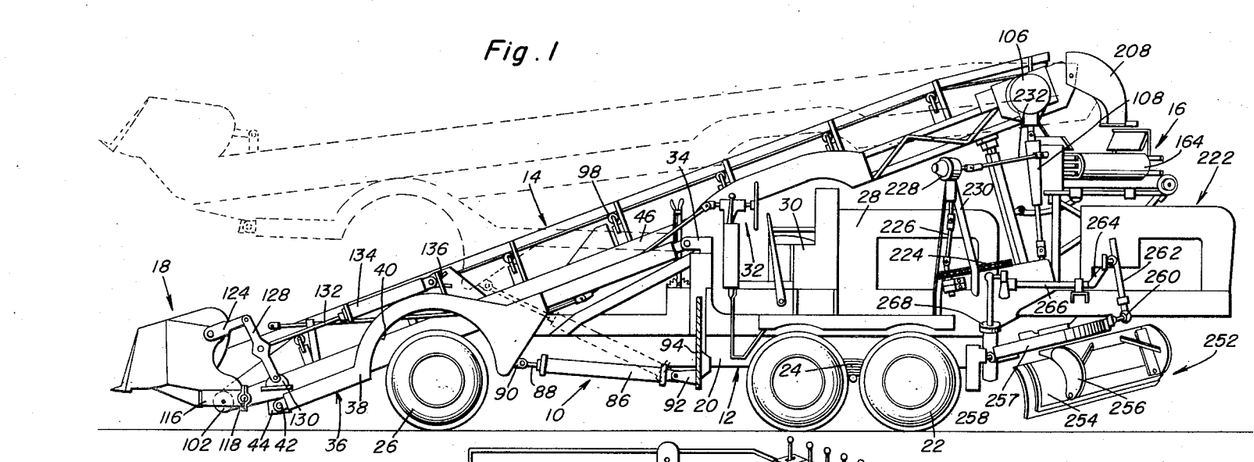
Figure 1 is a side elevational view of the earth moving apparatus of the present invention illustrating the elevated position of the primary conveying means in dotted lines and generally illustrating the overall structural details of the unit.

Also, the forward end of the primary conveyor 14 may be elevated by employing an elongated fluid pressure cylinder 86 having a piston 88 pivotally attached to rearwardly extending brackets 90 on the sub-frame 36 and the end of the cylinder 86 attached to forwardly extending brackets 92 mounted by a plate member 92 on the mobile frame 12 whereby expansion and contraction of the piston and cylinder arrangement 86 and 88 will cause the sub-frame 36 to pivot about pivot pin 96 which connects the ends of the longitudinal side rails 38 of the sub-frame 36 to the brackets 34 substantially as illustrated in Figure 1 and also in other of the figures.

The primary conveyor 14 includes a plurality of transverse rollers 98 movably supporting an endless conveyor belt 100 which extends over a forward end pulley 102 and a rear end pulley 104. The rear end pulley 104 is driven through a power transfer case 106 having a telescopic drive shaft 108 connected thereto and extending from a transmisison on the power unit on the mobile frame 12. Any suitable belt tightening means may be provided and this may be accomplished by moving the rear pulley 104 or adjusting the position of any of the idler rollers 98. It will be noted that the endless belt 100 is flexible and may be of any suitable construction and may be either provided with a smooth surface or a surface with transverse slats for more effective earth moving. Also, a pair of upwardly and outwardly flared side members 110 are provided on the primary conveying means 14 and are supported by suitable brackets 112 whereby earth will be retained on the upper surface of the endless belt 100 for movement from the forward end of the primary conveying means 14 to the rear end thereof whereby the earth will be discharged from the rear end of the primary conveying means 14.

Illustrated in Figures 1 and 3A of the official drawings is the means 18 for moving earth onto the front end of the primary conveyor 14. This means 18 is in the form of a vertical bucket having a pair of forwardly extending and outwardly diverging side walls 114 having bottom members 116 pivotally clamped to studs 118 on the front end of the primary conveyor frame 46 whereby the side walls 114 may swing vertically for engagement with a vertical bank. Extending transversely between the front and lower edges of the side walls 114 is a plurality of digger elements 120 mounted on a bottom wall 122 which terminates above the upper surface of the endless conveyor belt 100 whereby dirt dug from a vertical bank by the teeth or diggers 100 will be deposited on the conveying belt since the bottom wall 122 slopes downwardly at a very sharp angle when the vertical bucket is pivotally upwardly at the forward end wherein the vertical bucket would act similar to a shovel with a bottom wall 122 actually becoming a side wall and the space between the rear edges of the side walls 114 would become the bottom and since there is no wall between the rear edges of the side walls 114, the dirt will fall freely onto the conveyor belt 100.

For pivoting the vertical bucket about the pivotal connection 118, a pair of arms 124 are provided on mounting brackets 126 with the outer end of each of the arms 124 being connected to a link 128 having the other terminal end pivotally attached to a bracket 130. The center of the link 128 is pivotally attached to a piston rod 132 which is reciprocated by a fluid pressure cylinder arrangement 134 wherein the cylinder 134 is pivotally attached to brackets 136 on the primary conveyor frame 46 whereby the vertical bucket may be swung in a vertical plane upon proper expansion and contraction of the piston and cylinder arrangement 132 and 134 thereby permitting the earth to be dug from a vertical bank and deposited upon the conveyor belt 100 for moving upwardly along the primary conveying means.

Referring now specifically to Figures 3A and 4 of the official drawings, it will be seen that part of the steering mechanism 32 includes a steering wheel 138 having an elongated steering column 140 connected thereto which operates the usual drag link 142 which is connected to the usual tie rod 144 that in turn interconnects the horizontally offset arms 146 on the spindle support members 148. The front axle 150 is sectional and supported from the frame by support means 152 at the center thereof. The spindle support members 148 are pivotally attached to the outer ends of the axle 150 by pivot pins 154 and the upper ends of the spindle support members 148 are connected to an elongated link 156 having a fluid pressure expansion member 157 connected to one end thereof with the end of the fluid pressure expansion and contraction member 157 being attached to an upstanding member 158 rigidly attached to the axle 150 whereby expansion and contraction of the expansion member 157 will tilt the spindle supporting means 148 about a pivot axis formed by the pivotal connection between the spindle supporting member 148 and the axle 150 as designated by the numeral 154. This identical construction is provided for both sides of the axle for tilting the front wheels in a vertical plane whereby the spindle supports 148 will pivot about substantially a longitudinal axis. Also, a suitable fluid pressure expansion and contraction device may be substituted or employed in conjunction with the drag link 142 for moving the same transversely of the machine 10 thereby steering the wheels about substantially a vertical axis for controlling the direction of movement of the machine 10. Any suitable universal connections may be employed in the steering column 140 necessary for providing rotational power to the desired point.

Referring specifically to Figures 5–8, the secondary conveying means generally designated by the numeral 16 includes a generally elongated framework 160 having a plurality of idler rollers 162 mounted on the upper and lower surface thereof for supporting an endless conveyor belt 164. The endless conveyor belt 164 encircles an end roller 166 at one end thereof and an end roller 168 at the other end thereof. Upwardly and outwardly diverging side rails 170 retain the earth on the upper surface of the conveyor belt 164. The entire framework 160 is supported by bracket members 172 which are attached to a sub-frame generally designated by the numeral 174 which also supports rollers 176 engaging the outer surface of the lower run of the belt 164. Supporting the sub-frame 174 which extends transversely of the mobile frame 12 is a pair of longitudinal rods or tubular guide members 178 which are supported by suitable brace members 180. The sub-frame 174 also includes longitudinal members 182 having depending lugs 184 slidably mounted on the tubular guide rails 178 for longitudinal movement in relation to the tubular guide members 178. A transverse member interconnecting the longitudinal rails is designated by the numeral 186 and includes a depending bracket 188 pivotally attached to an arcuate interconnecting rod 190 by a pivot pin 192. The arcuate rod 190 is pivotally attached by link means 194 to the rear edge of one of the brace members 50 whereby rearward movement of the brace 50 caused by elevation of the front end of the primary conveying means 14 will cause the sub-frame 174 for the secondary conveying means 16 to move rearwardly thereby moving the secondary conveying means rearwardly for retaining the proper alignment of the rear end of the primary conveying means 14 and the secondary conveying means 16.

Figure 5:
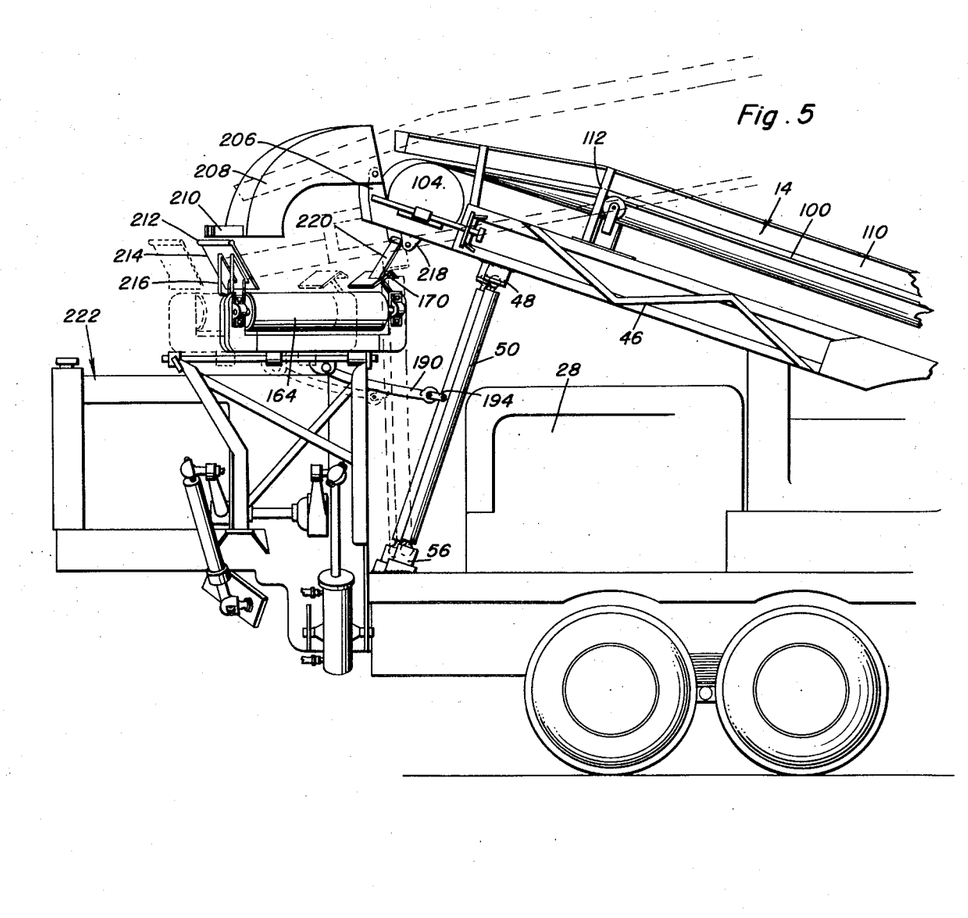
Figure 5 is a side elevational view of the rear end of the apparatus taken from the side opposite from Figure 1.
Figure 6:
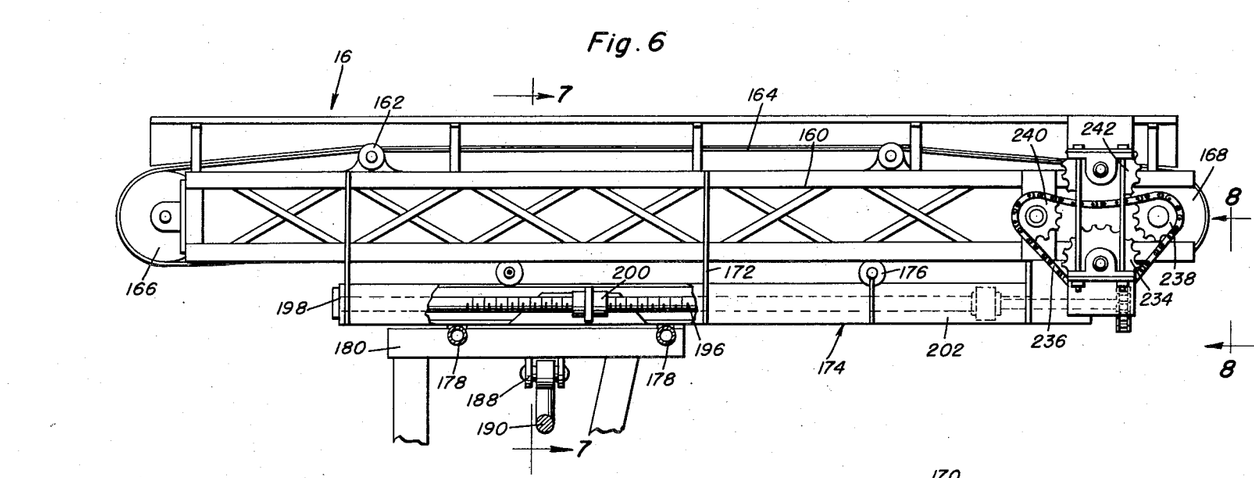
Figure 6 is an enlarged detailed view of the transverse or secondary conveying means with portions thereof broken away illustrating the adjusting means and the driving mechanism.
Figure 7:
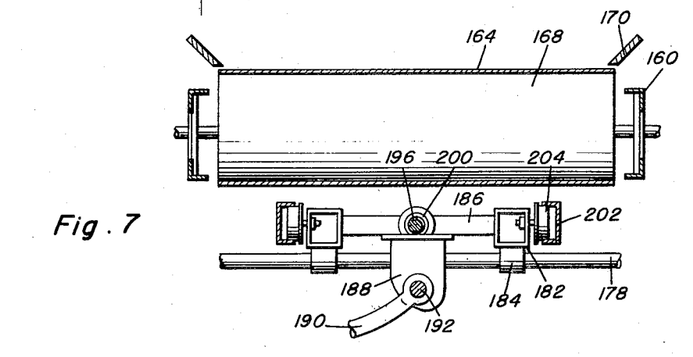
Figure 7 is a detailed sectional view taken substantially upon a plane passing along section line 7—7 of Figure 6 illustrating further structural details of the secondary conveying mechanism.

An elongated screw threaded member 196 is provided and is mounted in end members 198 connected to the frame 160 for rotation therein. A threaded member 200 is mounted on the interconnecting member 186 and is in engagement with the elongated threaded member 196. Also, a pair of longitudinal inwardly extending tracks or channel-shaped members 202 are mounted on the frame 160 and rollers 204 are journaled on the frame rails 182 of the sub-frame 174 whereby rotation of the threaded member 196 will cause the channel-shaped rails 202 to move longitudinally which, of course, will move the framework 160 longitudinally of itself and move the secondary conveying means 16 transversely of the earth moving apparatus 10 whereby the earth may be discharged to either side of the machine. Referring specifically to Figure 5, it will be seen that the primary conveyor frame 46 is provided with a pair of extending brackets 206 to which is pivotally attached a generally U-shaped shield 208 having a pair of outwardly projecting guide members 210 at the free end thereof. The guide members 210 rest upon the upper edge 212 of a supporting plate member 214 mounted by a pair of brackets 216 from the conveyor frame 160. Also, a pair of depending brackets 218 are provided on the extensions 206 and a pivotal plate 220 is attached between the brackets 218 for engagement with the inwardly inclined side rail 170 for guiding the dirt onto the endless conveyor belt 164. As the front end of the primary conveying means 14 is raised and lowered, the secondary conveyor means 16 will be moved rearwardly and the dirt will be guided thereon by the guide members 208 and the plate 220 wherein all of the elements retain substantially the same relationship.

For driving the secondary conveying means 16, an independent power unit generally designated by the numeral 222 is provided on the mobile frame 12 and this power unit includes a power take-off having a chain drive 224 connected to a flexible drive shaft 226 having a power transmission case 228 pivotally attached to a supporting brace 230 whereby the power transmission case 228 may be pivoted about substantially a vertical axis. The power transfer case 228 is connected to a drive shaft 232 connected to a main drive gear 234 supported on the frame 160. The gear 234 is a sprocket gear and an endless sprocket chain 236 encircles the sprocket gear 234 and a drive sprocket gear 238 attached to the roller 168 for moving the conveyor belt 164. Also, the sprocket chain 236 encircles an idler gear 240 in alignment with the drive sprocket gear 238 and also passes under an idler sprocket gear 242 mounted in opposition to the drive sprocket gear 234 so that the tension on the sprocket chain 236 may be adjusted and equalized whether the roller 168 is driven in one direction or the other. The pivotal mounting of the transfer case 228 permits the lateral movement of the secondary conveying means and the telescopic drive shaft 232 permits power to be supplied to the secondary conveying means 16.

Figure 8:
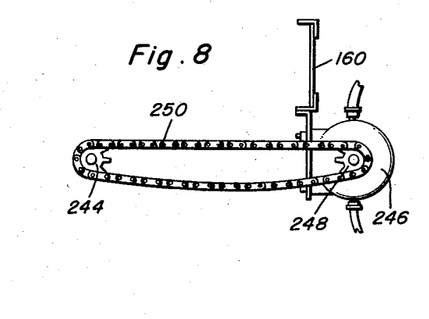
Figure 8 is a detail view taken substantially upon a plane passing along reference line 8—8 of Figure 6 illustrating the means for driving the adjusting screw for moving the transverse conveyor transversely of the apparatus.

For driving the elongated screw threaded member 196, it will be noted that a sprocket gear 244 is provided on the end of the threaded member 196 as illustrated in Figure 8 and a fluid motor 246 has a sprocket chain 248 thereon wherein an endless sprocket chain 250 encircles the sprocket gears 248 and 244 for rotating the threaded member 196 when fluid pressure is supplied to the fluid motor 246 by the control mechanism 232.

Referring now specifically to the rear portion of Figure 1 of the official drawings, it will be seen that the numeral 252 generally designates a grader blade construction including a generally elongated arcuate blade of any suitable construction which is designated by the numeral 254 and which is supported by bracket members 256 from a turning circle 257 which is pivotally supported at one end by a ball and socket connection 258 and at the other end by a ball and socket connection 260 attached to a lift arm 262 that is universally attached to an offset end 264 of a crank shaft 266 having a fluid pressure expansion and contraction arrangement 268 attached thereto for rotation of the same whereby the turning circle 257 may be adjusted for raising and lowering of the grader blade 254. Also, power means is provided for rotating the blade 254 about substantially a vertical axis which is perpendicular to the turning circle and includes a driven gear in meshing engagement with the gear teeth 270 in the turning circle 257 which is substantially conventional construction. Also, it will be noted that the grader blade may be mounted on either side of the vehicle since suitable hydraulic piston and cylinder arrangements are provided as is a crank shaft for supporting the turning circle 257. It will be noted that the grader blade arrangement 252 is disposed laterally of the line of the conveying mechanism 14 whereby the grader blade arrangement 252 may be employed for moving material from adjacent the bank or from any grade to deposit the material in a neat longitudinal pile whereby the conveying mechanism may then be employed to pick the same up. Accordingly, by employing the grader blade 252 along with the conveying mechanism, the blade mechanism 252 may deposit the soil or earth in a longitudinal row while the conveying mechanism is picking up the row of earth that was deposited by the previous pass of the grader blade mechanism 252 whereby the earth moving machine not only provides a mechanism for picking up the earth but also provides a mechanism for depositing the earth in easily accessible position simultaneously wherein a single machine is used for a multiplicity of purposes.

Figure 9:
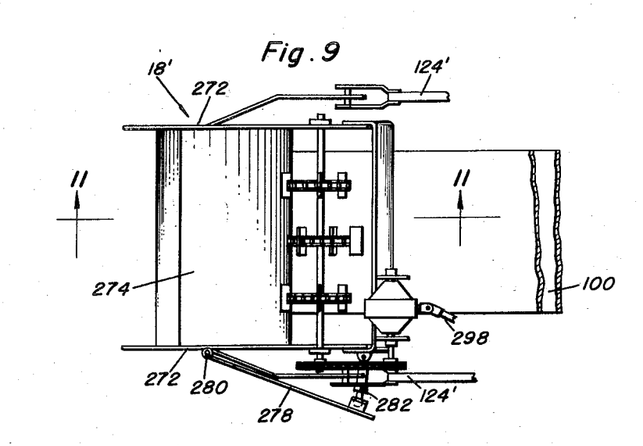
Figure 9 is a detail top plan view of a horizontal scoop type bucket attached to the forward end of the primary conveying mechanism for gathering earth from a horizontal surface.
Figure 10:
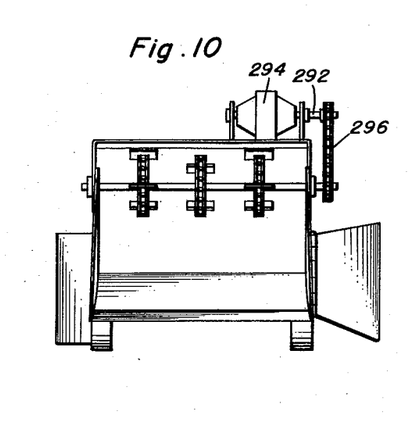
Figure 10 is a front elevational view of the horizontal bucket illustrated in Figure 9.
Figure 11:
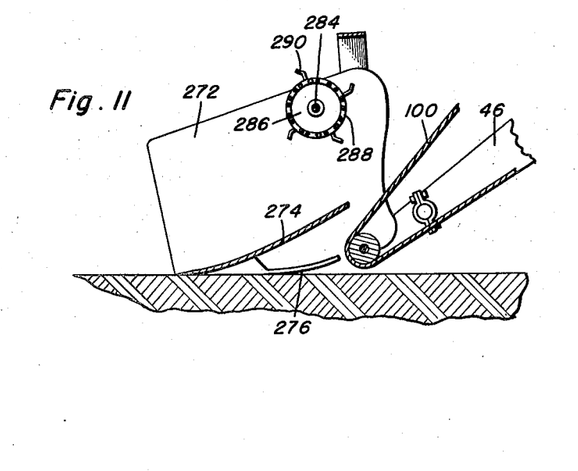
Figure 11 is a detailed longitudinal sectional view taken substantially upon the plane passing along section line 11—11 of Figure 9 illustrating the relationship of the bottom of the horizontal bucket to the conveying belt together with the relationship of the beaters or kickers rotatably mounted transversely of the horizontal bucket.

Referring now specifically to Figures 9–11, it will be seen that the numeral 18' generally designates a different type of means for guiding earth onto the conveyor belt 100. This means 18' is in the form of a substantially horizontally opening bucket which includes a pair of vertical side walls 272 interconnected with a bottom wall 274 that is upwardly inclined and terminates at the rear edge at a point above the conveyor belt 100. A ground engaging shoe or runner 276 is provided under the bottom 274 for protection against excessive wear of the bottom plate 274 wherein the bottom plate 274 will be substantially long wearing. The horizontally disposed bucket is mounted in the same manner as the vertically opening bucket 18 and is pivoted in the same way by employing pivot arms 124'. A side plate or wing plate 278 is provided on one of the side members 272 and includes a hinge 280 at its forward end for hingedly connecting the wing plate 278 to the side member 272. The rear end of the wing plate 278 is adjustably attached to the side plate 272 by an adjustable member 282 whereby the wing plate 278 may be adjusted in relation to the side member 272 whereby the wing plate 278 will engage the vertical portion of a bank in order to prevent the forward edges of the side members 272 from digging into a vertical bank when the conveyor is being employed alongside such a vertical bank.

Disposed transversely between the upper edges of the side plates or members 272 is an elongated shaft 284 having sprocket gears 286 mounted thereon with a chain 282 encircling the same wherein the chain 282 has a plurality of laterally projecting digging elements 290 thereon for engaging and breaking up the earth as it is deposited onto the conveyor belt 100. A plurality of the gears 286 are provided and effectively cover the entire area of the bucket between the side members 272. The end of the shaft 284 is provided with a sprocket gear in alignment with a sprocket gear on the output shaft 292 of a gear transfer case 294 whereby an endless sprocket chain 296 is provided for driving the shaft 284 thereby rotating the digger elements 290. The gear transfer case 294 receives its power from a drive shaft 298 which extends forwardly on the frame 12 and is detached when the vertical bucket 18 is employed.

Figure 2:
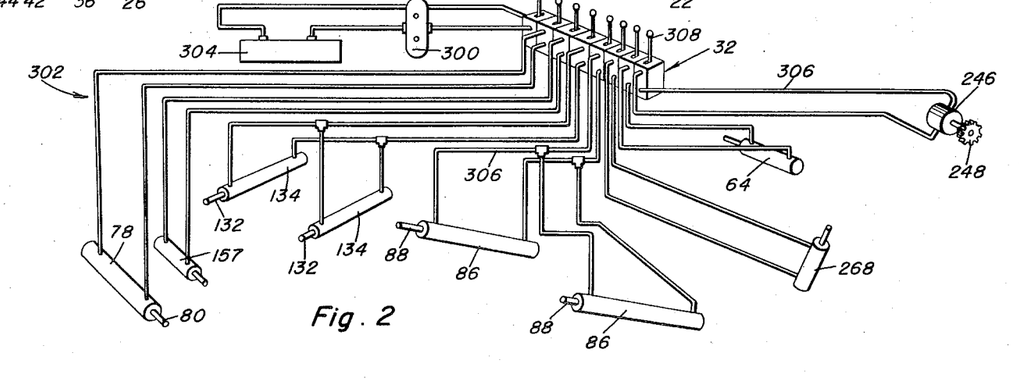
Figure 2 is a schematic view of the hydraulic system for operation of the various fluid power devices employed in the present invention.

As illustrated in Figure 2, a fluid pressure pump 300 is provided and is driven by the prime mover 28 and a fluid pressure system generally designated by the numeral 302 includes a reserve tank 304 and suitable pressure lines 306 which are controlled by the control mechanism 32 which includes a plurality of control levers 308 arranged adjacent the operator's seat 30 for convenient control of all of the fluid pressure actuated piston and cylinder arrangements as well as the fluid motor 246 whereby all elements of the device may be adjusted and controlled by a single operator by proper operation of the control handles 308 for selectively admitting pressurized fluid into the piston and cylinder arrangements or discharging the same therefrom. It will be noted in Figure 2 that the various piston and cylinder arrangements have been schematically arranged to illustrate the approximate relative position and line of movement whereby the various elements of the invention may be easily controlled and adjusted.

The entire apparatus may be provided with the usual and necessary accessories such as running lights, an ignition system, a protective covering for the operator and any other of the well-known conveniences found in this type of apparatus. Also, lubrication fittings may be provided wherever deemed necessary for reduction in friction and wear and the universal adjustment of the primary conveying means 14 provides an earth moving apparatus which is highly adaptable for various purposes in various types of terrain and in various conditions such as adjacent a vertical wall or bank and the combination of the grader blade with the conveying mechanism provides an efficient type of conveyor which permits the earth or soil to be picked up in one operation while during the same movement of the machinery, more earth is directed into an area more accessible for picking up and a subsequent operation of the conveying mechanism.

What is claimed as new is as follows:

1. An earth moving apparatus comprising a mobile frame, a primary conveying means adjustably mounted on said frame, a secondary conveyor disposed transversely on the frame, means for operating said primary conveying means, means for operating said secondary conveying means, and means on the front end of said primary conveying means for guiding earth into said primary conveying means, said primary conveying means including an elongated endless belt conveyor, means for moving the front of the conveyor laterally of the frame, and means for raising and lowering the front end of said conveyor, said means for raising and lowering the front end of said conveyor including a sub-frame pivotally interconnecting said frame and conveyor, and fluid pressure actuated means for pivoting said sub-frame in a vertical plane, said conveyor having the rear end thereof supported in elevated position with a pair of brace members, said brace members having universal pivotal connection to said frame and conveyor, and fluid pressure actuated means for controlling the swinging movement of said braces for varying the position of the rear end of said conveyor.

2. An earth moving apparatus comprising a mobile frame, a primary conveying means adjustably mounted on said frame, a secondary conveyor disposed transversely on the frame, means for operating said primary conveying means, means for operating said secondary conveying means, and means on the front end of said primary conveying means for guiding earth into said primary conveying means, said primary conveying means including an elongated endless belt conveyor, means for moving the front of the conveyor laterally of the frame, and means for raising and lowering the front end of said conveyor, said means for raising and lowering the front end of said conveyor including a sub-frame pivotally interconnecting said frame and conveyor, and fluid pressure actuated means for pivoting said sub-frame in a vertical plane, said conveyor having the rear end thereof supported in elevated position with a pair of brace members, said brace members having universal pivotal connection to said frame and conveyor, and fluid pressure actuated means for controlling the swinging movement of said braces for varying the position of the rear end of said conveyor, said secondary conveying means being transversely adjustable and provided with independent drive means, said drive means including a prime mover, a drive shaft extending therefrom, a transfer case mounted for adjustment about a vertical axis, and an adjustable length drive shaft extending from said transfer case to said secondary conveying means for driving the same at various transverse positions.

3. The combination of claim 1 wherein guide means is provided between the primary and secondary conveying means for preventing discharge of earth on the frame and other parts of the apparatus.

4. An earth handling device comprising a self-propelled vehicle having a longitudinally elongated frame, an endless belt conveyor adjustably mounted on said frame, means for supporting the rear end of the conveyor in elevated position, means for adjusting the rear end of the conveyor transversely of the frame, means for raising and lowering the front end of the conveyor in a vertical plane, means for adjusting the front end of the conveyor transversely of the frame, and fluid power means for independently adjusting the position of the ends of said conveyor, said means for supporting the rear end of the conveyor including a pair of brace members extending between the frame and the conveyor and being universally pivotally connected to said frame and conveyor.

5. An earth handling device comprising a self-propelled vehicle having a longitudinally elongated frame, an endless belt conveyor adjustably mounted on said frame, means for supporting the rear end of the conveyor in elevated position, means for adjusting the rear end of the conveyor transversely of the frame, means for raising and lowering the front end of the conveyor in a vertical plane, means for adjusting the front end of the conveyor transversely of the frame, and fluid power means for adjusting the position of said conveyor, said means for supporting the rear end of the conveyor including a pair of brace members extending between the frame and the conveyor and being universally pivotally connected to said frame and conveyor, said frame being provided with a transverse belt conveyor below the rear end of said longitudinal conveyor, means interconnecting said brace members and said transverse conveyor for moving the transverse conveyor in response to movement of the rear end of the longitudinal conveyor thereby maintaining the transverse conveyor in proper relationship to the longitudinal for receiving earth therefrom.

6. The combination of claim 5 wherein said transverse conveyor is transversely adjustably mounted on rollers, and an elongated screw threaded rod journaled on said transverse conveyor and engaging a stationary nut, and power means for rotating said rod for adjusting the transverse conveyor transversely of the frame.

7. The combination of claim 5 wherein said longitudinal conveyor is provided with earth guide means at the forward end thereof for guiding earth onto the conveyor.

8. An earth working apparatus comprising a powered vehicle having an adjustable grader blade mounted thereon for depositing earth in a row parallel to the path of movement of the vehicle, a conveyor mounted longitudinally on said vehicle, means on the front end of said conveyor for guiding material thereon during forward movement of the vehicle, means for adjusting said conveyor laterally of the vehicle for maintaining the conveyor generally parallel to the path of movement of the vehicle and disposing the conveyor substantially over the outer end of the grader blade, means for adjusting the vertical position of the front end of the conveyor for picking up the row of earth deposited by the grader blade during the preceding forward movement of the vehicle thereby simultaneously grading a surface and excavating the material discharged by the preceding pass of the grader blade.

9. An earth working apparatus comprising a mobile frame, a powered upwardly inclined conveyor extending longitudinally of the vehicle, and means on the front of the conveyor for continuously guiding earth onto the conveyor during forward movement of the frame, said guide means including a landside for preventing contact of the guide means with a vertical bank thereby eliminating digging in of the guide means.

10. An earth moving device comprising a propelled frame, a longitudinally extending conveyor mounted on said frame, said conveyor being upwardly and rearwardly inclined, and a transverse conveyor mounted on said frame in underlying relation to the rear end of the longitudinal conveyor for receiving material therefrom, each of said conveyors being mounted for permitting changes in the longitudinal and transverse attitudes thereof, each of said conveyors being powered for discharging material laterally of the frame, and interconnecting means between the conveyors for moving the transverse conveyor in response to variations in the position of the rear end of the longitudinal conveyor.

11. An earth moving device comprising a propelled frame, a longitudinally extending conveyor mounted on said frame, said conveyor being upwardly and rearwardly inclined, and a transverse conveyor mounted on said frame in underlying relation to the rear end of the longitudinal conveyor for receiving material therefrom, each of said conveyors being mounted for permitting changes in the longitudinal and transverse attitudes thereof, each of said conveyors being powered for discharging material laterally of the frame, and material guide means between the rear end of the longitudinal conveyor and the transverse conveyor for guiding material onto the transverse conveyor.

12. A vehicle mounted earth moving apparatus comprising an elongated longitudinal conveyor, means for selectively shifting both ends of the longitudinal conveyor laterally, means at the front end of the longitudinal conveyor guiding a continuous flow of pulverulent material onto the longitudinal conveyor during forward movement of the apparatus, a reversible transverse conveyor receiving material from the rear end of the longitudinal conveyor, said transverse conveyor being mounted for longitudinal and transverse movement, means for raising and lowering the front end of the longitudinal conveyor, means interconnecting the conveyors for moving the transverse conveyor in response to movement of the rear end of the longitudinal conveyor, and means for powering each of said conveyors whereby material may be picked up at the front of the vehicle, moved rearwardly on the longitudinal conveyor, and discharged laterally to either side of the vehicle.

13. An earth working apparatus comprising a mobile frame, a powered upwardly inclined conveyor extending longitudinally of the vehicle, and means on the front of the conveyor for continuously guiding earth onto the conveyor during forward movement of the frame, said guide means including a horizontally and forwardly opening bucket, a rotatable and powered digging element mounted transversely of the bucket for breaking up the earth as it moves rearwardly from the bucket onto the conveyor.

14. An earth working apparatus comprising a mobile frame, a powered upwardly inclined conveyor extending longitudinally of the vehicle, and means on the front of the conveyor for continuously guiding earth onto the conveyor during forward movement of the frame, said guide means including a forwardly opening bucket having side walls, one of said side walls having a ground engaging plate hingedly attached thereto adjacent the forward end for swinging movement about a generally vertical axis, and adjustable means connected with the rear portion of the plate for varying the spacing between the rear of the plate and the side wall for varying the spacing between the side wall and a vertical earth bank thereby preventing the bucket from digging into the vertical bank.

15. An earth working apparatus comprising a mobile frame, a powered upwardly inclined conveyor extending longitudinally of the vehicle, and means on the front of the conveyor for continuously guiding earth onto the conveyor during forward movement of the frame, said guide means including a horizontal bucket opening forwardly and rearwardly and mounted for swinging movement about a transverse axis, power means connected to the bucket for swinging the bucket in a vertical plane, said bucket having a bottom wall, the forward edge of the bottom wall having a plurality of forwardly projecting teeth rigidly mounted thereon for facilitating continuous movement of earth onto the conveyor and for digging earth.

16. An earth working apparatus comprising a powered vehicle having an adjustable grader blade mounted thereon for depositing earth in a row parallel to the path of movement of the vehicle, a conveyor mounted longitudinally on said vehicle, means on the front end of said conveyor for guiding material thereon during forward movement of the vehicle, means for adjusting said conveyor laterally of the vehicle for maintaining the conveyor generally parallel to the path of movement of the vehicle, means for adjusting the vertical position of the front end of the conveyor for picking up the row of earth deposited by the grader blade during the preceding forward movement of the vehicle thereby simultaneously grading a surface and excavating the material discharged by the preceding pass of the grader blade, and a transverse conveyor mounted on the vehicle below the rear end of the longitudinal conveyor for receiving material therefrom.

References Cited in the file of this patent

UNITED STATES PATENTS

| | | |
|---|---|---|
| 1,275,319 | Stuart | Aug. 13, 1918 |
| 1,749,968 | Blair | Mar. 11, 1930 |
| 1,907,373 | Turnham | May 2, 1933 |
| 2,321,168 | Tognetti | June 8, 1943 |
| 2,525,870 | Crofoot | Oct. 17, 1950 |
| 2,688,392 | Dion | Sept. 7, 1954 |
| 2,709,011 | Radin et al. | May 24, 1955 |
| 2,714,459 | Hay | Aug. 2, 1955 |
| 2,746,625 | Schwartz et al. | May 22, 1956 |
| 2,762,137 | Wells | Sept. 11, 1956 |